Feb. 6, 1962  H. C. PEARSON  3,019,882
LUMBER FEEDER
Filed March 26, 1959  2 Sheets-Sheet 1

INVENTOR.
HARRY C. PEARSON
BY
BUCKHORN, CHEATHAM & BLORE
ATTORNEYS

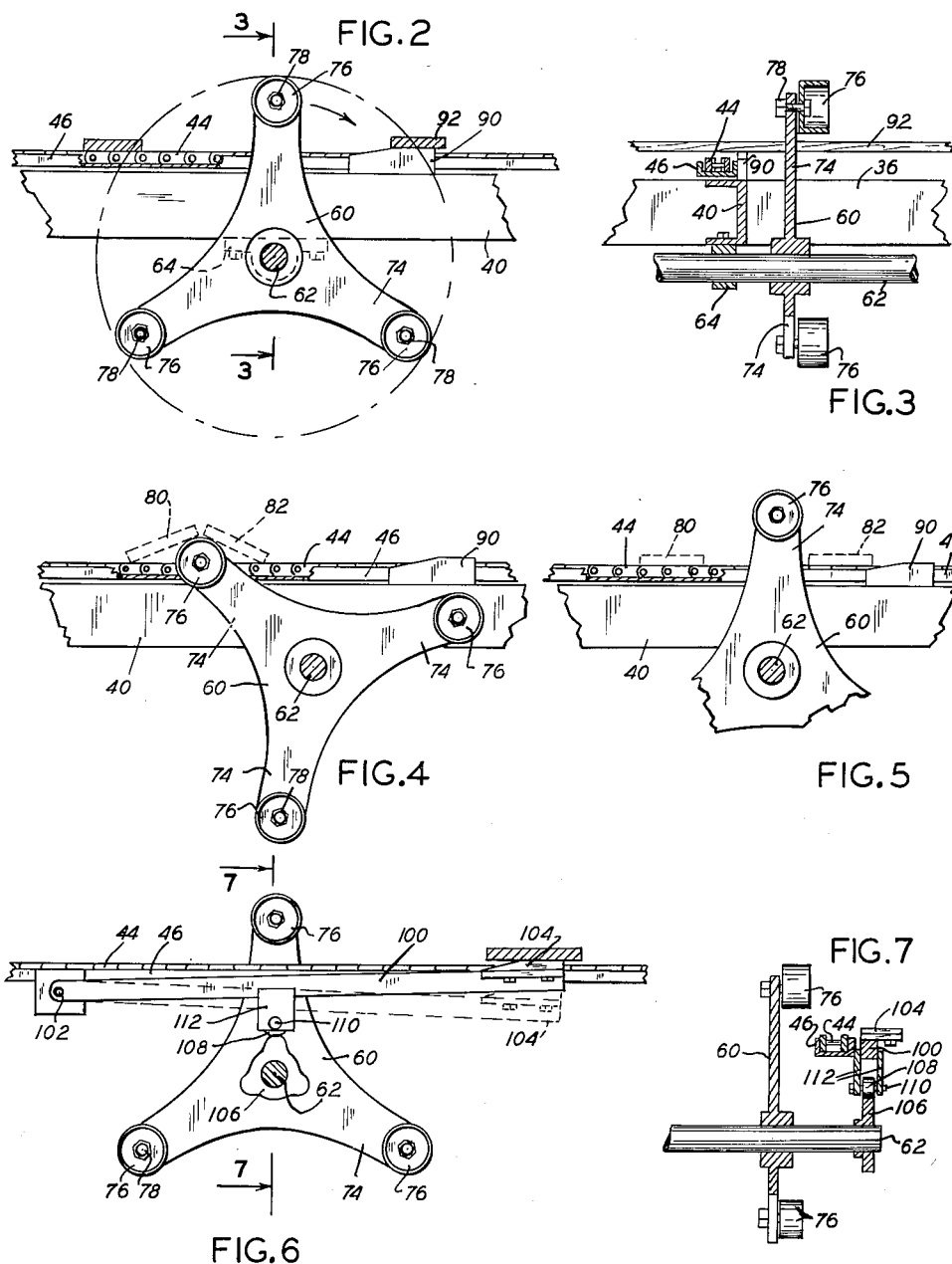

United States Patent Office

3,019,882
LUMBER FEEDER
Harry C. Pearson, Portland, Oreg., assignor to Portland Iron Works, Portland, Oreg., a corporation of Oregon
Filed Mar. 26, 1959, Ser. No. 802,127
3 Claims. (Cl. 198—34)

The present invention relates to material handling apparatus and more particularly to apparatus for feeding lumber.

In the preparation of lumber for market, it is the practice to trim boards to even lengths and to remove intermediate sections of boards which may contain unwanted knots or other defects by feeding the boards individually through a trimmer carrying a plurality of trimmer saws and which may be operated to move in or out of the path of a board to trim it as desired. A persistent problem in lumber mills is in the feeding of boards to the trimmer. Heretofore, boards have, in large part, been fed manually onto the feed table of the trimmer. However, the trimmers can operate at a rate faster than one man can conveniently feed the boards thereto and it has not been found desirable or efficient to utilize the services of two men in feeding a trimmer. Various mechanical feeding contrivances have been devised and utilized to some extent heretofore. However, these prior feeding devices have had certain limitations. Some prior feeders tend to mar the edges of boards which is particularly undesirable in the case of finished stock or in the case of edge formed material like tongue and groove stock. Also, prior feeders have not been effective with random width material and cannot be used on boards that interlock as in the case of tongue and groove stock. In certain cases, it is desirable to trim the ends of boards prior to finishing the stock edges and difficulty has been found in prior apparatus in feeding boards where the edges were not trimmed and, hence, were not straight.

It is a principal object of the present invention to provide apparatus for feeding lumber to a trimmer and which does not possess the defects noted above.

A most important object of the invention is to provide a trimmer which can effectively handle random width boards.

Another object of the present invention is to provide apparatus for feeding boards to a lumber trimmer without injury to the boards.

Still another object is to provide a lumber feeding apparatus which is capable of separating interlocked boards of tongue and groove stock and of feeding such boards singly onto the feed table of the lumber trimmer.

A further object of the invention is to provide lumber feeding apparatus which is capable of handling boards with irregular edges.

Still other objects and advantages of the invention will become more apparent hereinafter.

In accordance with the illustrated embodiment, the present invention comprises a feed table or accumulator section to which boards can be fed from previous mill operations and accumulated and from which they are fed onto a somewhat slower traveling conveyor section which is adapted to feed boards one-by-one onto a positioning section comprising a plurality of conveyor flights upon which the boards extend laterally. As the boards are advanced along the conveyor flights of the latter section, they are adjusted in their position upon the conveyor flights by apparatus of the invention to predetermined positions on the conveyor flights. The boards are fed from the conveyor flights of the positioning section onto the feed table of the trimmer saw and the speed of the conveyor flights of the positioning section are so adjusted that a board within a predetermined position on the conveyor flights is fed onto the trimmer immediately in front of an advancing set of lugs of the trimmer which are utilized to move the boards through the trimmer saws.

For a more detailed description of the invention, reference is made to the accompanying drawings wherein:

FIG. 2 is a sectional view of a portion of the apparatus illustrating details thereof;

FIG. 3 is a sectional view taken substantially along the line 3—3 of FIG. 2;

FIG. 4 is a fragmentary view of a portion of the apparatus illustrating details of the operation thereof;

FIG. 5 is a fragmentary view of the apparatus illustrated in FIG. 4 illustrating a further sequence in the operation of apparatus of the invention;

FIG. 6 is a view partially in section of a modification of the invention; and

FIG. 7 is a sectional view taken substantially along line 7—7 of FIG. 6.

Figure 1:
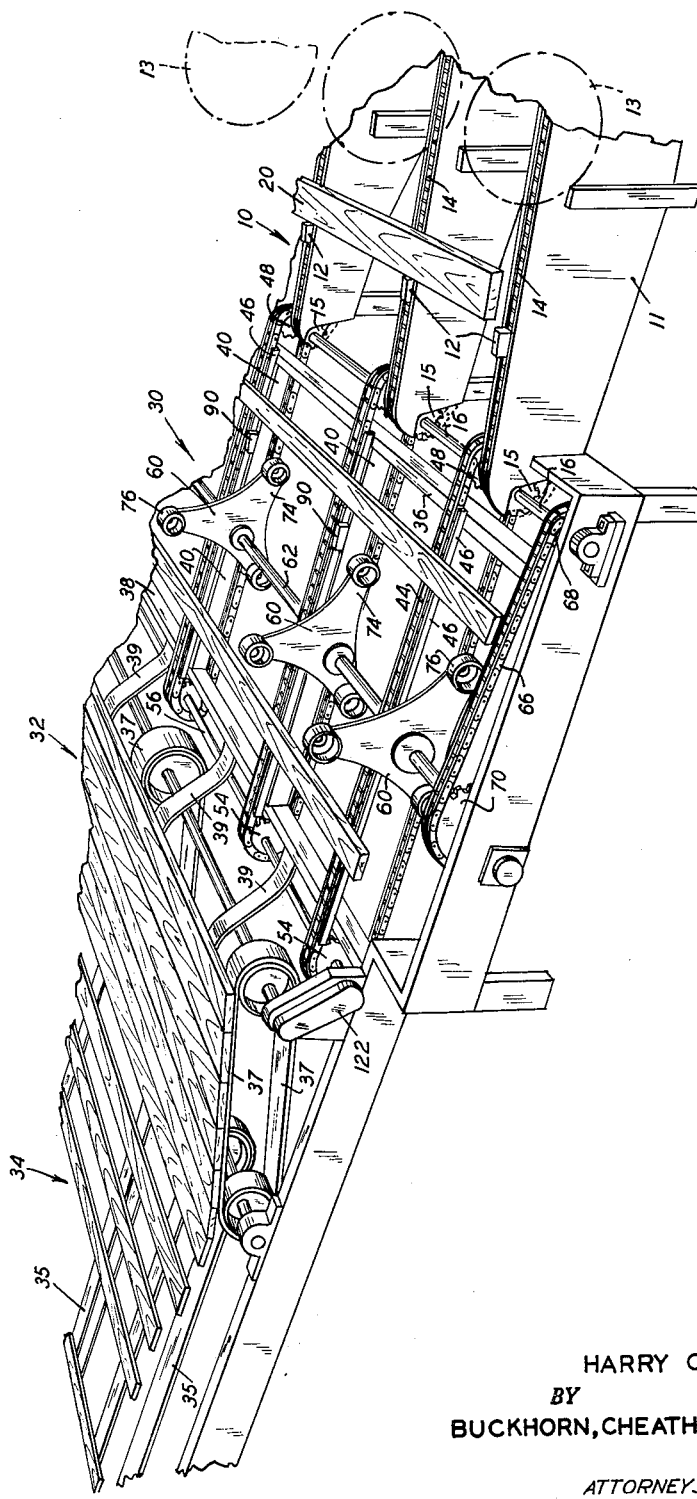
FIG. 1 is a fragmentary perspective and somewhat schematic view of apparatus embodying the present invention.

With particular reference first to FIG. 1, the feed table of a conventional trimmer, with which the present invention is particularly adapted to be used, is indicated generally at 10 and comprises, in this instance, a plurality of chain races 11. As is well known, boards to be trimmed are moved along the table 10 toward trimmer saws indicated in dash-dot lines at 13 by means of sets of lugs 12 carried by feed chains 14 trained over sprockets 15 mounted on the tail shaft 16 of the trimmer. At the fore end of the table to which pieces of lumber or boards to be trimmed are fed, such as the board 20, the chains 14 protrude slightly above the surface of the feed table 10 so that the boards are carried directly thereon. As the chains 14 approach the trimmer saws 13, they are dropped beneath the surface of the table 10 so that the boards will come to rest on the table until actually engaged by the lugs 12, as is the board 20. This assures alignment of the boards with the lugs 12 so that the boards are not carried slantwise through the saws 13. The trimmer saws may be actuated in any suitable manner, such as, for example, by the system shown in my prior Patent No. 2,714,407.

In accordance with the invention, boards are fed singly between the sets of lugs 12 by a feeding mechanism including a positioning section or apparatus indicated generally at 30, a metering or deal off section or apparatus 32, and an accumulator section 34. The accumulator section 34 is adapted to receive boards from a planar or other source and comprises a plurality of conveyor elements 35, such as belts or chains, driven by any suitable means so as to advance boards thereon toward the metering section 32 at a somewhat greater speed than boards are advanced along the trimmer table 10. The metering section comprises a plurality of feed belts or other suitable conveyor elements 37 inclined upwardly from the end of the accumulator section 34 and driven at a rate somewhat slower than the rate of speed of the trimmer conveyor chains 14. Since the conveyor flights 37 of the metering section 32 are moving slower than the conveyor of the accumulator section 34, boards will accumulate at the take-off end of the section 34 as indicated in FIG. 1 and will align themselves in substantial edge-to-edge position upon the metering section 32 as shown. As boards reach the upper end of the metering section 32, they will fall off the end of the conveyor elements and slide upon guides 39 onto the conveyor flights of the positioning section 30 on which the boards are positioned in a predetermined manner so that they may be fed one-by-one from the section 30 intermediate the sets of lugs 12 on the off-bearing trimmer chains 14. Details of the foregoing mechanisms will now be described with more particular reference to other figures of the drawings.

With reference first to FIGS. 1 to 5, inclusive, the positioning section 30 comprises a frame including transverse end members 36, 38 and longitudinally extending members 40 suitably secured together. Extending longitudinally of the section 30 are a plurality of conveyor elements, such as chains 44, which have an upper flight supported in channel members 46 extending between the transverse end members 36, 38. The chains 44 are trained over sprockets 48 at the end of the section 30 adjacent the trimmer 10 and which sprockets preferably are mounted on the tail shaft 16 of the trimmer. The chains or conveyor flights 44 are supported at the other end of the section 30 by sprockets 54 mounted on a shaft 56 journaled in suitable brackets extending outwardly from the adjacent transverse end member 38.

It will be apparent that depending upon their position upon the chains 44, boards would be carried thereon in position to be deposited on the chains 14 between the sets of lugs 12 or in a second position wherein they would pass directly onto the lugs 12 as they advance up over the sprockets 15. Means are provided in the positioning section 30 to shift any boards which might be in the latter position upon the conveyor elements 44 so that they are moved to the former position, that is in a position where they will be fed from the section 30 onto the conveyor chains 14 between the sets of lugs 12 carried thereby. In the illustrated embodiment of the invention, such means comprise arm means adapted to engage beneath any boards in an undesired position on the conveyor elements 44 and to advance or retard such boards so that they are moved within the limits of a desired position on the conveyor elements 44. Such arm means may comprise star wheels 60 fixed upon a shaft 62 journaled in brackets 64 secured to the frame members 40. The shaft 62 is driven in timed relation to the trimmer tail shaft 16 by means of a chain 66 extending over a sprocket 68 fixed to the shaft 16 and a sprocket 70 fixed to the shaft 62.

With particular reference now to FIGS. 2 and 3, the star wheels 60 each comprise a plurality of radially extending lobes or arms 74 on the ends of which are rotatably mounted wheels or rollers 76. The rollers 76 are mounted on axle members 78 extending at right angles to the arms 74 in parallel relation to the shaft 62. The star wheels 60 are mounted between the conveyor elements 44 in such relation that the rollers 76 move bodily in an arc extending partially above the conveyor elements as indicated in FIG. 2 and are driven so that the rollers move bodily in the direction of movement of the conveyor elements when the rollers swing above the conveyor elements.

Referring now to FIGS. 4 and 5, should a board or boards, such as the boards 80, 82, be in such position on the conveyor elements 44 as to be engaged by the rollers 76 as they swing upwardly between the conveyor elements, the rollers will engage such boards and lift them above the conveyor elements. If the board, such as the board 80, is back of the center of the rollers 76 as they elevate, the board will be lifted and tilted so that it will slide rearwardly on the conveyor elements 44 and thus be delayed in its advancement relative to its initial position on the conveyor elements. On the other hand, if a board forward of the wheels 76, such as the board 82, is engaged by the wheels, it is lifted and tilted as indicated in FIG. 4 so that it will slide along the conveyor elements 44 forwardly of the wheels 76 and thus be advanced relative to its initial position on the conveyor elements 44. The rotation of the star wheels 60 is correlated with the movement of the conveyor chains 14 of the trimmer so that the wheels 76 will engage, as they rise, beneath any boards lying in a position such that they would be fed from the conveyor chains onto the lugs 12. Thus, the star wheels effect adjustment of the position of boards on the conveyor elements 40 to predetermined positions thereon such that boards within such predetermined positions will be fed from the conveyor elements 74 onto the chains 14 of the trimmer between the sets of lugs 12.

Means are also provided in association with the conveyor elements 44 to adjust a board to within the trailing part of a said predetermined position on the chains 44 so that such board will be fed onto the chains 14 immediately in front of an advancing set of lugs 12. With reference again to FIGS. 1 to 5, inclusive, such means may comprise a plurality of shoes 90 mounted on the frame members 40 and extending slightly above the upper surfaces of the conveyor elements 44. The forward end of the shoes, that is the end facing the advancing boards on the conveyor elements 44 is slanted upwardly so that a board riding on the conveyor elements is caused to ride up on the shoes and above the conveyor elements 44 as indicated by the board 92 whereby the motion of such board is arrested. The shoes 92 are located within the periphery of the arc of the rollers 76 and on the side of the star wheels 60 toward the discharge end of the section 30 so that as the rollers 76 swing downwardly, they will engage a board, such as shown at 92 in FIG. 2, resting upon the shoes 90 to push the board forwardly and back onto the conveyor elements 44. The rotation of the star wheels 60 is correlated with the movement of the chains 14 of the trimmer such that a board moved from the shoes by the rollers 76 will be positioned on the conveyor elements 44 so as to be fed by the latter onto the trimmer chains 14 directly in front of an advancing set of trimmer lugs 12.

An alternative and preferred means for adjusting the location of a board to position within the trailing part of a said predetermined position on the conveyor elements 44 is illustrated in FIGS. 6 and 7. In this embodiment of the invention, a plurality of supporting arms 100 are pivotally mounted between the conveyor elements 44 by pivots 102 suitably supported on the frame so that the arms may move vertically between a lowered position as shown in dotted lines in FIG. 6 beneath boards traveling on the conveyor elements 44 and an elevated position as shown in solid lines in FIG. 6 slanting upwardly between the conveyor elements. The free end of each arm 100 is provided with a beveled shoe 104 and is positioned between the star wheels 60 and the discharge end of the conveyor elements 44. Means are provided to raise and lower the arms 100 in timed relation with the trimmer chains 14. As illustrated, there is fixed to the shaft 62 in association with each arm 100 a cam 106 having lobes adapted to engage a roller 108 rotatably mounted on an axle 110 extending between brackets 112 fixed to the arm 100. The lobes of the cam 106 are so arranged as to permit the arm 100 to lower so that a board supported on the shoes 104 will be deposited on the conveyor elements 44 and fed by the latter onto the chains 14 immediately in front of an advancing set of lugs 12 and so that the arms will immediately thereafter rise to intercept the next board traveling on the conveyor chains and which by reason of the inclination of the arms will be caused to ride up on the shoes 104 and have its motion arrested.

With reference now to FIG. 1, any suitable means for driving the conveyor belts 37 of the metering section 32 may be used, such as a variable speed driving connection indicated at 122 from the tail shaft 56 of the section 30.

In like manner, the conveyor element 35 of the accumulator section 34 may be driven by any suitable means such as through a driving connection (not shown) to the conveyor belts 37 of the metering section.

*Operation*

In use, boards to be trimmed are fed by suitable means onto the conveyor elements 35 of the accumulator section 34 and upon which they are carried to the foot of the metering section 32. Since the conveyor belts 37 of the latter section are moving at a slower rate than the conveyor elements 35, boards will tend to accumulate at the discharge end of the section 34 and to advance onto the conveyor belts 37 in edge-to-edge relation. Boards are carried upwardly on the conveyor belts 37 until finally they reach the upper edge thereof from which they tip over and slide off onto the guides 39 and downwardly onto the conveyor elements 44. The tipping of the boards as they reach the end of the belts 37 will effect separation of tongue and groove stock so that the boards will be fed singly onto the conveyor elements 44.

Considering the case of a single board being carried along the conveyor elements 44, if the board is within the said predetermined position on the conveyor elements 44, it will be carried therealong and moved past the star wheels 60 between the arms thereof until finally, it is carried up onto the shoes 92 if the apparatus is constructed in accordance with the embodiment of FIGS. 1 to 5. As indicated previously, when the rollers 76 swing downwardly, they will engage a board resting upon the shoes 90 to push the same back onto the conveyor chains 14 immediately in front of a set of lugs 12 and advanced toward the trimmer saws 13.

In the event that the apparatus is constructed in accordance with the modification illustrated in FIGS. 6 and 7, if a board advancing on the chains 44 is within its predetermined position, it will advance past the star wheels 60 between the arms 74 thereof and will move toward the shoes 104 of the supporting arms 100. If the board is in any part of its predetermined position on the chain except the trailing part, it will be moved up onto the shoes 104 and its motion arrested temporarily until the cams 106 permit the arms 100 to lower whereupon the board will be redeposited on the chains 44 in the trailing part of the desired predetermined position thereon and then be advanced by the conveyor elements 44 and deposited upon the conveyor chains immediately in front of a set of lugs 12. On the other hand, if a board advancing past the star wheels 60 is already positioned in the trailing part of the desired predetermined position of the board, the arms 100 will drop as the board advances thereover so that the board will advance over the shoes 104 without being engaged thereby and will then be fed by the conveyor chains 44 onto the conveyor chains 14 immediately in front of a set of lugs 12 thereof.

If a board advancing toward the star wheels 60 is not within the desired predetermined position of the board upon the conveyor elements 44, the rollers 76 will engage beneath the board and either tilt it rearwardly or forwardly causing the board to slide either rearwardly on the conveyor elements 44 or forwardly thereon as previously described so as to fall within one of the desired predetermined positions for the board. The board will then advance toward the means for adjusting the board to the trailing position within the predetermined position and which operation will be effected as described above.

The speed of the conveyor belts 37 of the section 32 preferably is adjusted so that the belts feed boards onto the spacing section 30 at a rate just slightly less than the rate at which the boards can be handled by the trimmer 10. This minimizes the possibility that two boards will advance past the star wheel 60 without engagement and consequent separation thereby. Where boards of uniform width are being handled, such speed adjustment is easily made. Where boards of random width are being handled, the speed of the conveyor belts 37 is adjusted to about the average of the board width. After brief experience, operators will have no difficulty in making the necessary speed adjustment.

Though the invention has been described in connection with feeding of lumber, it will be obvious that the apparatus can be utilized in handling and feeding other elongated objects. Accordingly, having illustrated and described the preferred embodiments of the invention, it should be apparent to those skilled in the art that the invention permits of modification in arrangement and detail. I claim as my invention all such modifications as come within the true spirit and scope of the appended claims.

I claim:

1. In lumber handling apparatus, a plurality of laterally spaced off-bearing chains having laterally aligned sets of lugs thereon for engaging and advancing boards positioned on said chains between said lugs, means for driving said chains at a predetermined speed, and feeding mechanism for feeding boards singly between said sets of lugs, said feeding mechanism comprising a plurality of laterally spaced conveyor elements positioned forwardly of said off-bearing chains for carrying boards toward and discharging such boards onto said off-bearing chains, means for driving said conveyor elements at a predetermined speed, and means for spacing boards upon said conveyor elements within predetermined limits comprising arm means mounted between said conveyor elements for rotation about an axis positioned below said conveyor elements so that said arm means may rotate in an arc extending partially above said conveyor elements, means driving said arm means to rotate the same with said arm means moving in the direction of movement of said conveyor elements when said arm means swing above said conveyor elements, said arm means upon engaging underneath a board in the upward swing of the arm means being adapted to advance or delay the board relative to the initial position of the board upon said conveyor element so that each board passing said arm means will be within a predetermined position on said conveyor elements, the rotation of said arm means being correlated with the movement of said off-bearing chains so that a board lying within a said predetermined position will be fed from said conveyor elements onto said off-bearing chains between the sets of lugs on said chains, and means associated with said conveyor elements to adjust a said board to within the trailing part of a said predetermined position so that such board will be fed onto said off-bearing chains immediately in front of an advancing set of said lugs.

2. In lumber handling apparatus, a plurality of laterally spaced off-bearing chains having laterally aligned sets of lugs thereon for engaging and advancing boards positioned on said chains between said lugs, means for driving said chains at a predetermined speed, and feeding mechanism for feeding board singly between said sets of lugs, said feeding mechanism comprising a plurality of laterally spaced, flexible conveyor elements positioned forwardly or said off-bearing chains for carrying boards toward and discharging such boards onto said off-bearing chains, means for driving said conveyor elements at said predetermined speed, means for feeding boards upon said conveyor elements with said boards extending laterally thereof, a plurality of star wheels having radially extending arms and rollers rotatably mounted on the ends of arms, said star wheels being mounted between said conveyor elements to rotate with rollers moving bodily in an arc extending partially above said conveyor elements, means driving said star wheels to rotate the same with said rollers moving bodily in the direction of movement of said conveyor elements when the rollers swing above said conveyor elements, said rollers upon engaging a board in the upward swing of the rollers being adapted to advance or delay the board relative to the initial position of the board upon said conveyor element so that each board passing said star wheel will be within a predetermined position on said conveyor elements, and means associated with said conveyor elements for adjusting the location of a said board so that it is within the trailing part of a said predetermined position comprising a plurality of shoes slanting upwardly between said conveyor elements so as to cause a board traveling on said elements to ride up on said shoe means and thereby have its motion arrested, said shoe means being located within the periphery of the arc of said rollers but on the side of said star wheels toward said off-bearing chains whereby as said rollers swing downwardly they will engage a board resting upon said shoe means to push the same onto said conveyor elements, the rotation of said star wheel being correlated with the movement of said off-bearing chains so that a board lying within a said predetermined position will be fed from said conveyor elements onto said off-bearing chains between the sets of lugs on said chains.

3. In lumber handling apparatus, a plurality of laterally spaced off-bearing chains having laterally aligned sets of lugs thereon for engaging and advancing boards positioned on said chains between said lugs, means for driving said chains at a predetermined speed, and feeding mechanism for feeding boards singly between said sets of lugs, said feeding mechanism comprising a plurality of laterally spaced, flexible conveyor elements positioned forwardly of said off-bearing chains for carrying boards toward and discharging such boards onto said off-bearing chains, means for driving said conveyor elements at a predetermined speed, means for feeding boards upon said elements with said boards extending laterally thereof, a plurality of star wheels having radially extending arms and rollers rotatably mounted on the ends of arms, said star wheels being mounted between said conveyor elements to rotate so that said rollers may move bodily in an arc extending partially above said conveyor elements, means driving said star wheels to rotate the same with said rollers moving bodily in the direction of movement of said conveyor elements when the rollers swing above said conveyor elements, said rollers upon engaging underneath a board in the upward swing of the rollers being adapted to engage such board and advance or delay it relative to the initial position of the board upon said conveyor element so that each board passing said star wheel will be within a predetermined position on said conveyor elements, the rotation of said star wheel being correlated with the movement of said off-bearing chains so that a board lying within a said predetermined position will be fed from said conveyor elements onto said off-bearing chains between the sets of lugs on said chains, and means associated with said conveyor elements for adjusting the location of a said board so that it is within the trailing part of a said predetermined position comprising a plurality of supporting arms positioned adjacent said conveyor elements between said star wheels and said off-bearing chains, means pivotally mounting said arms for movement between a lowered position beneath boards traveling on said conveyors and an elevated position slanting upwardly between the conveyor elements so as to cause a board traveling on said elements to ride up on said arms and thereby have its motion arrested, and means operating in timed relation with said off-bearing chains to lower said arms so that a board supported thereon will be redeposited on said elements and fed by the latter onto said off-bearing chains intermediate the sets of lugs carried by said off-bearing chains and immediately in front of an advancing set of lugs.

References Cited in the file of this patent

UNITED STATES PATENTS

| | | |
|---|---|---|
| 1,892,670 | Jaeger | Jan. 3, 1933 |
| 2,346,421 | Gantzer | Apr. 11, 1944 |
| 2,776,038 | Caldwell | Jan. 1, 1957 |